United States Patent [19]

Boyle

[11] Patent Number: 5,255,096
[45] Date of Patent: Oct. 19, 1993

[54] VIDEO TIME CODE SYNCHRONIZED ROBOT CONTROL APPARATUS

[76] Inventor: William M. Boyle, 2092 Saint Andrews, Rochester Hills, Mich. 48309

[21] Appl. No.: 866,446

[22] Filed: Apr. 10, 1992

[51] Int. Cl.$^5$ .............................................. H04N 7/18
[52] U.S. Cl. ..................... 358/93; 358/101; 395/94; 360/14.2
[58] Field of Search ................ 358/93, 101, 100, 149; 395/80, 92, 94, 99; 901/46; 360/14.2, 33.1

[56] References Cited

U.S. PATENT DOCUMENTS

| | | | |
|---|---|---|---|
| 4,503,470 | 3/1985 | Mita et al. | 360/33.1 |
| 4,532,557 | 7/1985 | Larkins | 360/33.1 |
| 4,651,203 | 3/1987 | Peterson | 358/101 |
| 4,789,961 | 12/1988 | Tindall | 364/900 |
| 4,802,023 | 1/1989 | Williams | 360/14.3 |
| 4,831,316 | 5/1989 | Ishiguro et al. | 901/46 X |
| 4,837,487 | 6/1989 | Kurakake et al. | 318/568.16 |
| 4,837,638 | 6/1989 | Fullwood | 360/14.2 |
| 4,858,033 | 8/1989 | Chippendale | 360/14.2 |
| 4,939,594 | 7/1990 | Moxon et al. | 360/14.1 |
| 5,018,009 | 5/1991 | Koerv | 358/100 |
| 5,046,022 | 9/1991 | Conway et al. | 395/99 X |
| 5,063,456 | 11/1991 | Horiuchi et al. | 358/310 |
| 5,066,902 | 11/1991 | Watanabe | 395/94 X |

Primary Examiner—Victor R. Kostak
Attorney, Agent, or Firm—Basile and Hanlon

[57] ABSTRACT

The stored robot control program defining the path of movement of a robot arm carrying a video camera is synchronized to time code information recorded on a video tape. Video signals from the video camera are recorded on the video tape by a video tape recorder along with time code information from a time code generator. A time code reader decodes the time code information from the video tape or from the video tape recorder and supplies the decoded time code information to a robot controller. The time code information specifying the address of each frame of video signal is synchronized with the robot control program to enable the robot arm to be positioned in the same identical positional coordinates corresponding to the position of the robot arm when a particular frame of video signal was originally generated.

14 Claims, 4 Drawing Sheets

VIDEO TIME CODE SYNCHRONIZED ROBOT CONTROL APPARATUS

BACKGROUND OF THE INVENTION

The present invention relates to robots and, also, to apparatus for composing video source material.

In the production of audiovisual films, videos, television commercials, movies, and the like, a video camera is used to record video images and/or audio signals on a video tape. The video tape may be carried directly by the camera, as in a video camcorder, or the video images from a video camera may be output to a video tape recorder (VTR) which records the video images on a video tape. The video tape can then be played back to review the recorded images.

As frequently occurs during the production of audiovisual materials, it is oftentimes necessary to re-shoot some portion of the recorded sequence of images. When this occurs, the video tape must be rewound to the desired position or frame to enable new video images to be recorded over old images or new video images are recorded on a separate tape. After the new and old images are recorded on different tapes, the two video tapes are then edited by merging the desired portions of the two tapes into a single tape to form the desired sequence of video images. A number of video tape editing devices are available to perform such editing operations.

Time code generators are also well known and are used to generate standardized time codes. Such time codes are developed according to standards set by the SMPTE (Society of Motion Picture and Television Engineers) and the EBU (European Broadcasting Union). The time codes are formed of a binary code corresponding to hours, minutes, seconds and frame number of each frame of a video signal starting from a zero point and continuing during the entire video image running time. The time code information is encoded onto a recording medium by a video tape recorder on a separate track from the tracks containing the video information for each frame of the video signal. The recorded time code information acts as an address to identify each frame to permit electronic editing of video tapes.

During editing, time code readers are employed to locate a particular frame on a video tape. However, such editing is a time consuming process requiring a considerable amount of skill and costly time code generators, time code readers and tape synchronizers which result in high post production costs to form a complete audiovisual tape.

As described above, it is often necessary during the production of audiovisual material to re-shoot the same sequence of images many times before a final sequence is obtained. The camera and/or the object(s) being filmed must be moved through the same path of movement with only the desired variations being introduced in each separate re-shoot. Various devices have been employed to repeatedly move an object and/or camera through a predetermined path.

Robots have been developed, primarily for industrial applications, to move a tool, etc., mounted at the end of an end effector on a robot arm in a predetermined multi-axis path of movement according to a stored program executed by a robot controller.

It is known to mount a camera on the movable arm of a robot so as to be able to repeatedly move the camera through a predetermined path of movement while the camera is operated to record a sequence of video images. However, heretofore, there has been no known attempt to synchronize the movement of the robot as it executes its stored control program with the advance or reverse movement of a video recording medium storing video images in a predetermined sequence to enable the robot and the recording medium to be moved in synchronization to a predetermined position corresponding to a particular frame on the video tape with the robot being positioned in the same position as it was while the image was shot. The different speeds of the film transport in the video camera and/or video tape recorder and the motors controlling the position and speed of movement of the robot arm have made such synchronization difficult and have resulted in hit or miss efforts to position a robot in a particular position in multiple axes corresponding to a particular robot position in a particular frame on a video tape.

Thus, it would be desirable to provide an apparatus for synchronizing robot or machine movement with a video recording medium such that the robot or machine can be positioned in the same position as recorded on each frame of the video tape. It would also be desirable to provide an apparatus for use with a robot or machine and a video recording apparatus which enables the robot arm to be moved to any position corresponding to a particular frame of a recorded video image while remaining synchronized in time with the video recording.

SUMMARY OF THE INVENTION

The present invention is a video time code synchronized robot control apparatus which synchronizes the position of a robot or other automated machine having a camera mounted on a movable robot arm with the frame-by-frame images on a video recording medium.

The apparatus includes a robot or machine having an arm movable through a path of movement. A video camera is mounted on the arm and generates video signals during movement of the camera along the path of movement of the arm. A time code generator means generates time code information for use with the video signals from the video camera. A video tape recorder in response to the video signals from the video camera and the time code information from the time code generator means records a composite video signal formed of the video signal from the video camera and the time code information from the time code generator onto a video recording medium.

A time code reader means is responsive to the composite video signal output from the video tape recorder and decodes the time code information. The decoded time code information is input to a robot controller means which controls the path of movement of the robot arm in accordance with a taught and/or stored program. The robot controller, in response to the decoded time code information from the time code reader, synchronizes the movement of the robot arm along its programmed path of movement with the time code information on a video image frame-by-frame basis.

In one embodiment, the video signals from the video camera are input to a time code generator which generates time code information for each frame of video signals. The video signals and the time code information are then output to a video tape recorder which records a composite signal of the video signal and the time code information onto a video tape recording medium. A video monitor may also be provided and controlled by the video tape recorder for displaying the video images. On a real time basis or during playback of the video tape in the video tape recorder, the time code information on the video tape is decoded by a time code reader which outputs the decoded time code information to the robot controller. In another embodiment, the output of the video camera and the time code information from the time code generator are separately input to a video tape recorder which records the composite signal formed of the video images and the time code information onto separate tracks of a video recording medium or tape. The output from the video tape recorder is decoded by the time code reader and input to the robot controller as in the first embodiment.

In yet another embodiment, the video signals from the video camera are input to a combined time code qenerator/reader. The time code generator portion of the combined time code generator/reader generates time code information and outputs the video images and the generated time codes to a video tape recorder which stores the video images and the time code information on a video tape. The output of the video tape recorder is input to the combined time code generator/reader which decodes the time code information and outputs the decoded time code information to the robot controller.

The decoded time code information from the time code reader is synchronized with the multi-axis positional coordinates of the robot control program by any of a number of different means. In an exemplary embodiment, the robot controller, upon receiving the decoded time code information, generates and stores in memory the time code information for each frame of the video signal and the multi-axis robot arm positional coordinates corresponding to each frame. In this manner, upon receipt of a particular time code defining a particular frame of the video signal, the robot controller can position the robot arm in the positional coordinates corresponding to those at which the particular video image was originally taken.

The unique video time code synchronized robot control apparatus of the present invention simplifies the production of audiovisual materials by enabling the video images stored frame-by-frame on a video tape to be coordinated in time with the positional coordinates of a multi-axis robot controller. This enables the robot controller to move its arm carrying the video camera to the same position in which a particular frame of video signals was generated. This simplifies the editing of video tapes by enabling the robot to be moved to any desired position in synchronization with the video images and new video images generated and recorded onto the same tape. This also simplifies post production editing of multiple video tapes and insures that the robot, the robot arm and the video camera carried by the robot arm are in the same identical position corresponding to each frame of the video signals.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
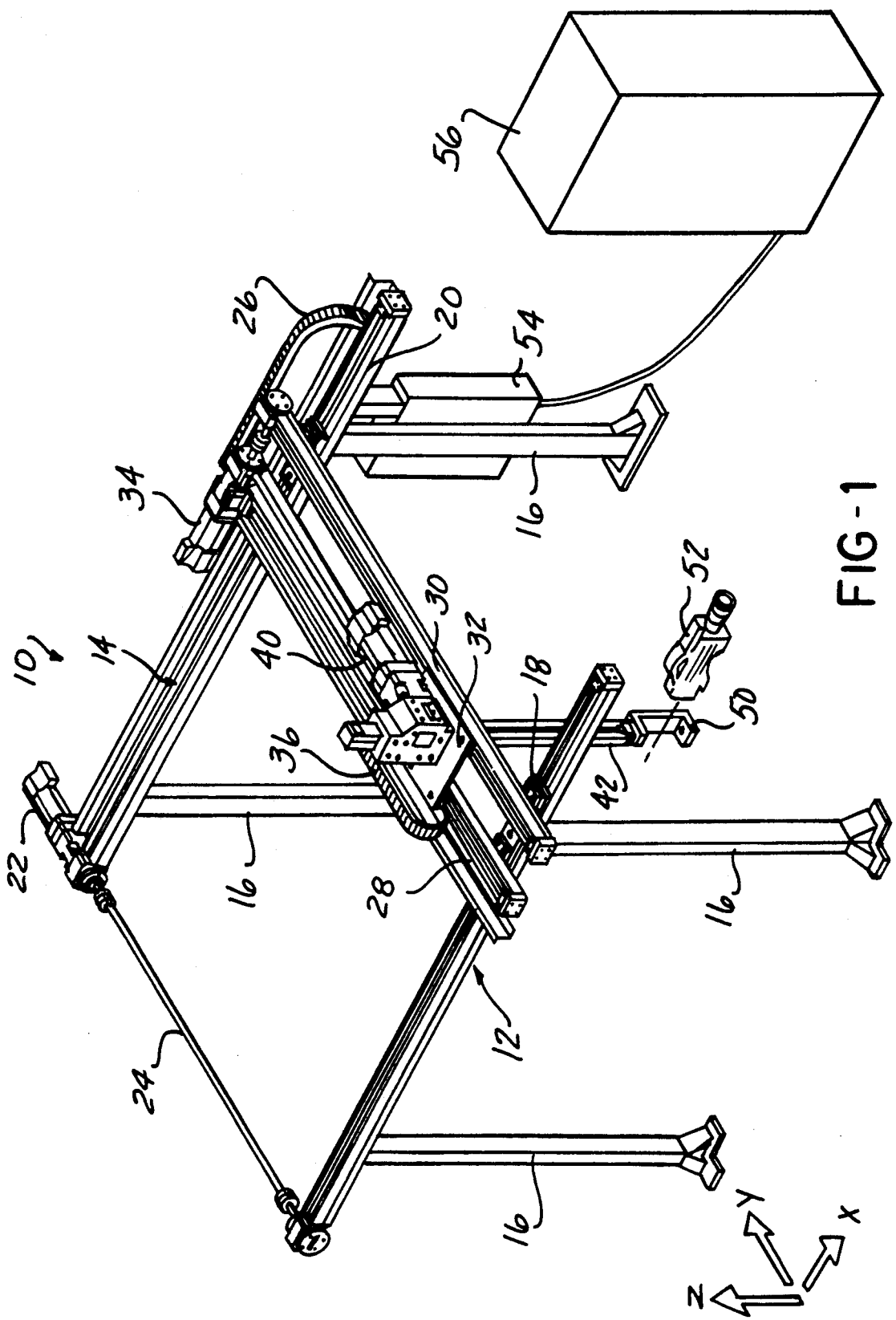
FIG. 1 is a perspective view of a robot apparatus designed to move a video camera through a predetermined, programmed path of movement.

Referring now to FIG. 1, there is depicted one embodiment of a robot control apparatus usable with the present invention. It will be understood that any type of robot, such as a gantry-type robot 10 shown in FIG. 1, as well as pedestal robots may also be used. Further, the term "robot" is also meant to include any machine which is capable of repeatedly moving an arm or member thereof along a predetermined path of movement.

By way of example only, the robot 10 is an AEG 8000 Series gantry-type robot. This robot 10 includes four frame members, only two of which 12 and 14 are shown in FIG. 1. The frame members 12 and 14 are supported above a floor by a plurality of upright legs 16.

The frame members 12 and 14 are disposed in parallel and spaced apart. The frame members 12 and 14 are formed as channel-like members which slidably support horizontal sliders 18 and 20, respectively. The horizontal sliders 18 and 20 are slidably disposed in the frame members 12 and 14, respectively, and are movable along an axis, hereafter denoted as the X axis. A horizontal slider drive means is provided for driving the horizontal sliders 18 and 20 in a bi-directional manner along the frame members 12 and 14. By way of example only, the drive means comprises an electric motor 22 mounted at one end of the frame member 14. The output shaft of the motor 22 is mounted in a bearing and engages a drive pulley, not shown. A similar drive pulley is mounted in the frame member 12 and is connected to the output shaft of the motor by a coupling shaft 24. A timing belt, not shown, is mounted in each of the frame members 12 and 14 and is operably coupled to the drive pulleys associated with the motor 22. Rotation of the output shaft and drive pulleys by the motor 22 results in movement of the timing belt which drives the horizontal sliders 18 and 20 reciprocatingly along the frame members 12 and 14.

A pair of spaced, channel-like cross members 28 and 30 are mounted at opposite ends to the horizontal sliders 18 and 20 and span the horizontal sliders 18 and 20. The cross members 28 and 30 extend along a Y axis perpendicular to the X axis defined by the frame members 12 and 14. A carriage 32 is slidably mounted on the cross members 28 and 30 and is reciprocatingly driven along the cross members 28 and 30 by a Y axis drive motor 34 mounted on one end of the cross members 28 and 30. A timing belt extends through the cross member 28 and is reciprocatingly driven through a pulley by the Y axis drive motor 34. The timing belt is coupled to the carriage 32 and drives the carriage 32 reciprocatingly along the Y axis upon activation of the Y axis drive motor 34.

A third or Z axis drive motor 40 is mounted on the carriage 32 and reciprocatingly moves a Z axis channel 42 substantially vertically through the carriage 32.

An end effector 50 is slidably mounted on the Z axis channel 42 and is vertically movable along with the channel 42 in response to bi-directional rotation of the output shaft of the Z axis motor 40. A conventional video camera 52 is mounted on the end effector and is moved by the robot apparatus 10 along a programmed multi-axis path of movement.

The electrical control signals to the various drive motors 22, 34 and 40 as well as feedback signals, etc., pass through a junction box 54 and are supplied by electrical conductors, cables, etc., mounted in cable carriers 26 and 36 to a robot controller means 56. Any conventional robot controller 56 may be employed, such as a Modicon 3240/3220 Flexible Automation Controller, for example only. Such a robot controller includes a central processing unit or computer which executes a control program stored in a memory. A keyboard and a display, not shown, are also provided with the robot controller 56. As is conventional, such robot controllers 56 are adapted for learning a particular path of movement of the end effector 50. In such a learning or teach mode, the end effector 50 is manually moved or jogged through a predetermined multi-axis path of movement and each step or sequence of steps are input to the robot controller which stores the multi-axis positional coordinates of the robot arm, i.e., the Z axis channel 42, at each step. The sequence of steps thus defines the predetermined path of movement of the end effector 50 and the camera 52 mounted on the arm or Z axis channel 42.

Figure 2:
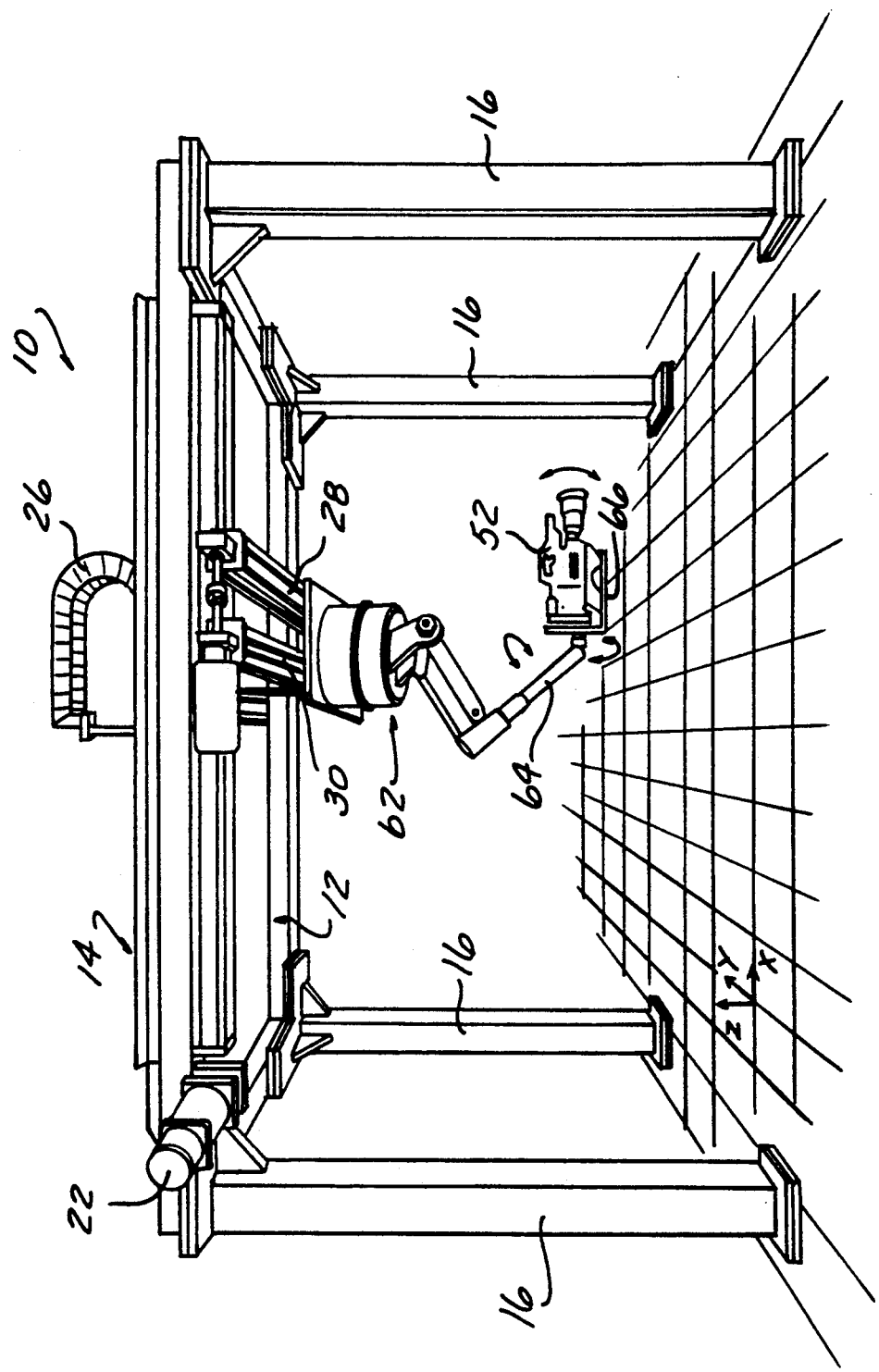
FIG. 2 is a perspective view of another embodiment of a robot apparatus usable with the present invention.

FIG. 2 depicts another embodiment of a robot 60 usable with the present invention. The robot 60 includes the same gantry-type robot described above and shown in FIG. 1. However, in this embodiment the Z axis channel 42 is replaced by a second robot 62. The second robot 62 is mounted to the Y axis carriage 32 and thus is movable by the gantry robot 10 along the X and Z axes under the control of the robot controller 56.

The second robot 62 may be any type of pedestal-type robot, such as a Motoman K10 robot sold by Yaskawa Electric Mfg. Co., Ltd. The robot 62 includes a movable arm 64 to which a video camera 52 is mounted by means of a bracket 66. The robot 62 and the movable arm 64, which are controlled by the same robot controller 56 controlling the gantry robot 10, provides a greater freedom of movement for the camera 52 in conjunction with the X and Y axis movements provided by the gantry robot. In both of the robots 10 and 62, a rotatable end effector may be mounted on the robot arm to support the video camera 52 and provide an additional axis of movement to the video camera 52.

Figure 3:
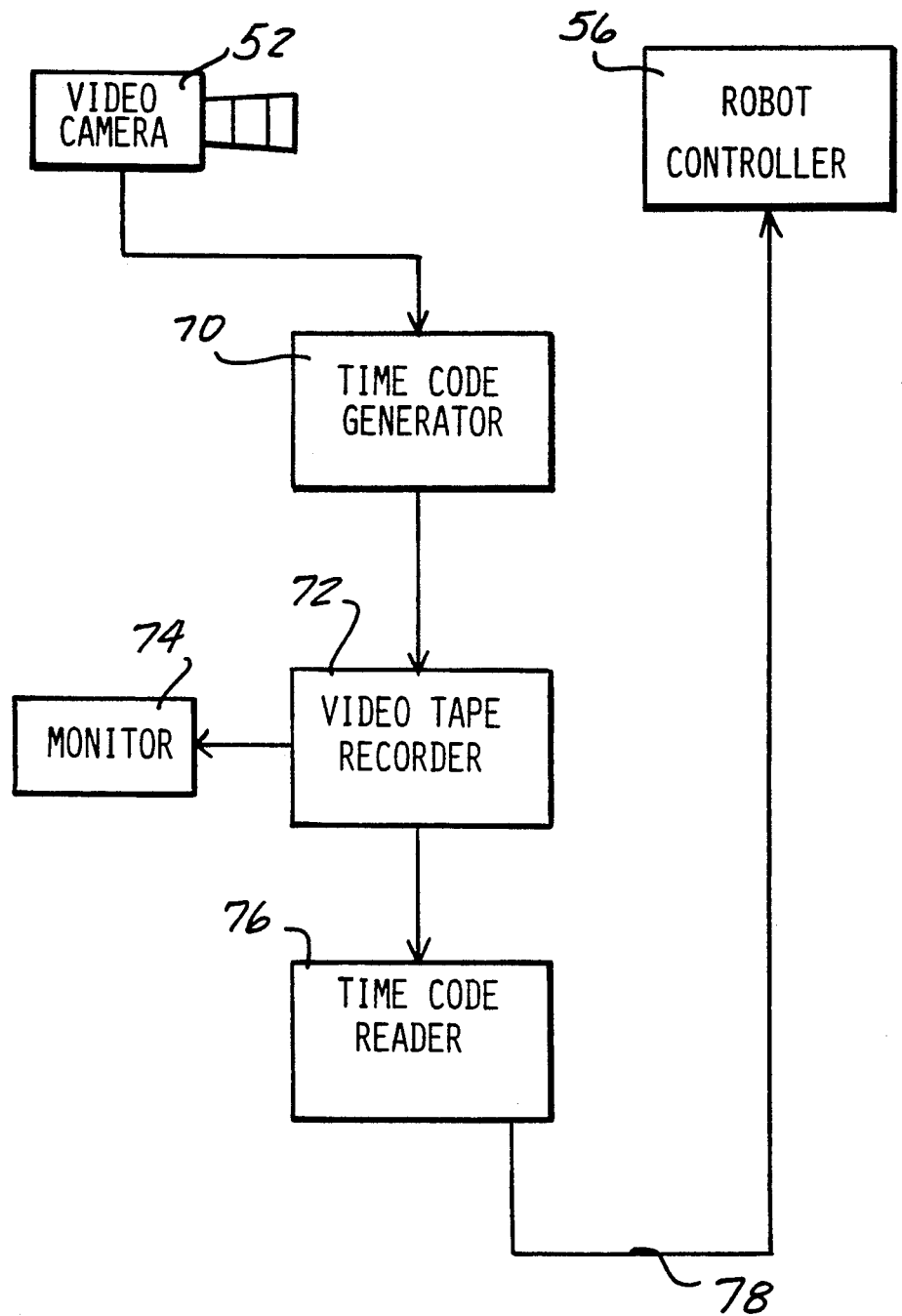
FIG. 3 is a block diagram of one embodiment of the apparatus of the present invention.

Referring now to FIG. 3, there is depicted one embodiment of a video time code synchronization control apparatus which coordinates video image time codes with the positional coordinates stored in the robot controller 56 to coordinate the multi-axis position of the robot 56 with the video images recorded by the video camera 52. As shown in FIG. 3, the video signals output from the video camera 52 during movement of the camera 52 are input to a conventional time code generator means 70, such as a time code generator Model No. CDI-716A sold by Cipher Digital. As is well known, the time code generator means 70 generates a binary time code for each frame of video signals from the camera 52. The time code signal is in a standardized format as established by SMPTE (Society of Motion Picture and Television Engineers) or the EBU (European Broadcasting Union). The binary time code acts as an address for each frame of the video image or signals and specifies in encoded form the hour, minutes, seconds and frame number of running time of each frame of the sequence of video images from a zero or start frame. In the SMPTE time code format, a new frame of video signals is generated every 1/30th of a second. In the EBU format, each video signal frame is generated every 1/24th of a second. Other formats, such as 24 frame per second motion picture film formats, are also possible with the present invention.

In the embodiment shown in FIG. 3, the video signals from the video camera 52 and the time code generated by the time code generator means 70 are separately output from the time code generator means 70 to a conventional video tape recorder (VTR) 72. The video tape recorder 72 may be any suitable type of video tape recorder, such as a broadcasting-type video tape recorder. Such a video tape recorder 72 records a composite signal on a suitable video image recording medium, such as a video tape, which is formed of the video images and the associated time code on a frame-by-frame basis on separate tracks.

A monitor 74 may optionally be connected to the video tape recorder 72 to display the video images from the camera 52 in real time or the video images recorded on the video tape during playback.

A time code reader means 76 is connected to the video tape recorder 72 and receives time code information from the video tape recorder 72 on a frame-by-frame basis. The time code reader means 76, as is conventional, decodes the time code information and outputs, according to the present invention, the decoded time code information to the robot controller 56. The output signals from the time code reader means 76, denoted generally by reference number 78, may be in RS232 serial or RS422 parallel format. Further, such output signals from the time code reader means 76 may be in the specified form of a serial digital interface standard for communicating video equipment with digital equipment.

Figure 4:
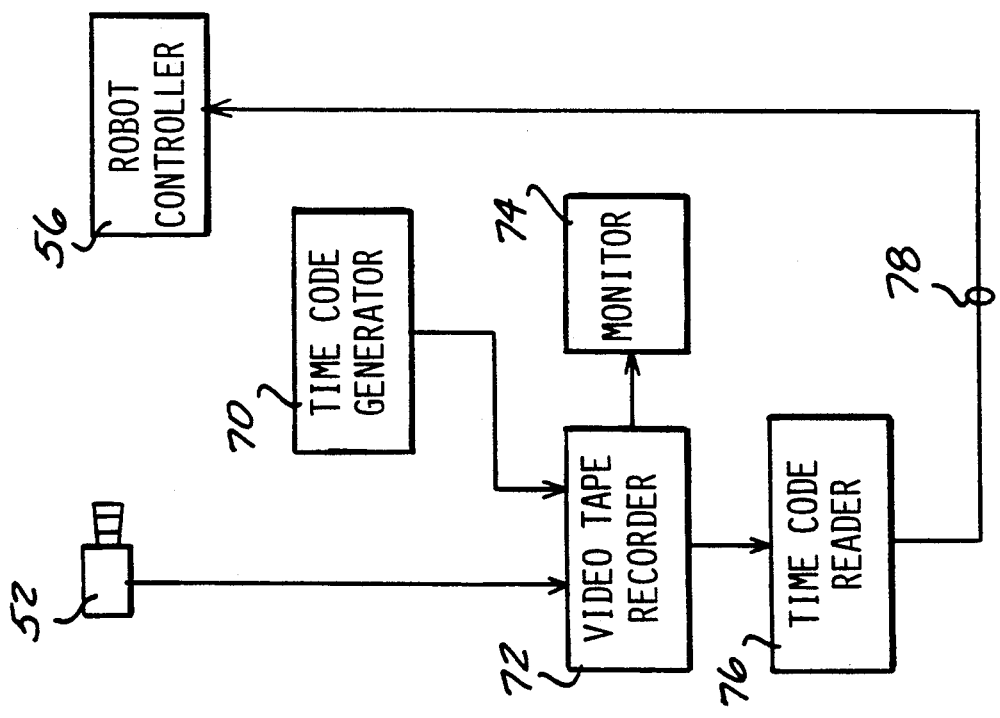
FIG. 4 is a block diagram of another embodiment of the apparatus of the present invention.

An alternate embodiment of the present invention is shown in FIG. 4 in which the same components as shown in FIG. 3 are connected in a different configuration, but provide the same result. As shown in FIG. 4, the video signals from the video camera 52 and the time code information from the time code generator means 70 are separately input to the video tape recorder 72. The video tape recorder 72 forms a composite signal of the video images and the time code information on a frame-by-frame basis and records the video signals and the time code information on separate tracks on a video tape recording medium in a normal manner. The recorded time codes are then decoded on a frame-by-frame basis by the time code reader means 76 and output to the robot controller 56.

Figure 5:
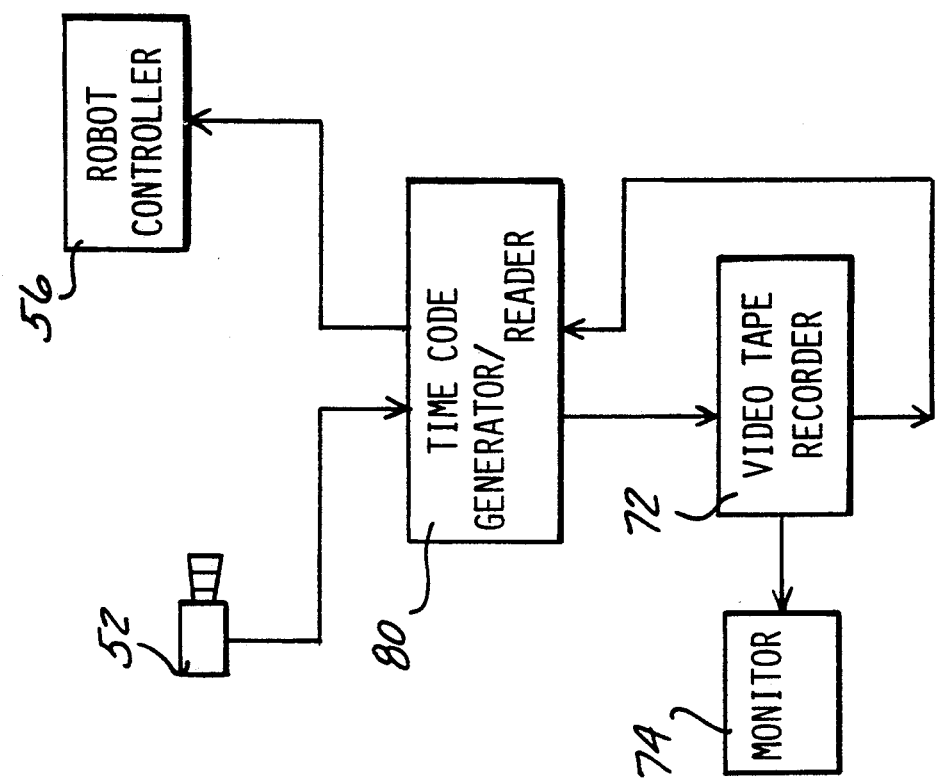
FIG. 5 is a block diagram of yet another embodiment of the apparatus of the present invention.

Another embodiment is shown in FIG. 5 in which the video signals from the video camera 52 are input to a combined time code generator/reader 80. The time code generator/reader 80 may be, by way of example only, a time code reader/generator event controller, Model No. CDI-750, sold by Cipher Digital. In the time code generator portion of the time code generator/reader 80, time code information is generated for each frame of video signals received from the video camera 52. The video signals and the time code information are output to the video tape recorder 72 on a frame-by-frame basis. The video tape recorder 72 records both signals on a video tape recording medium. Time code information on a frame-by-frame basis is output from the video tape recorder 72 to the reader portion of the combined time code generator/reader 80 the time code information and outputs the decoded time code signals to the robot controller 56.

An alternate embodiment of the apparatus shown in FIG. 5 may also be provided. In the alternate embodiment, as shown in FIG. 4, the outputs of the video camera 52 and time code information from the combined time code generator/reader 80 may be separate input to the video tape recorder 72 to form the composite signal which is recorded on the video tape by the video tape recorder 72.

In a preferred sequence of operations, it will be assumed that the robot 10 or 60 has been moved through a teach mode to learn a desired multi-axis path of movement, which path of movement is stored by positional coordinates in the memory of the robot controller 56. With the robots 10 or 10 and 60 positioned at their respective start positions, execution of the control program by the robot controller 56 will cause the robots 10 or 10 and 60 to move the robot arm through its predetermined path of movement thereby moving the video camera 52 along the same predetermined path of movement. Activation of the video camera 52 during such movement will cause a series of video signals on a frame-by-frame basis to be generated and output from the video camera 52.

Using the apparatus shown in FIG. 3, the video signals from the video camera 56 will be input to the time code generator means 70 which will generate time code information for each frame of video signal. The video signals and the time code information from the time code generator 70 are output to the video tape recorder 72 which records a composite signal containing the video signals and the time code information on a suitable video tape recording medium on a frame-by-frame basis.

In real time, while the video camera 52 is being moved through its predetermined path of movement or during playback, the time code information recorded by the video tape recorder 72 on the video tape is output to the time code reader means 76 which decodes the time code information and supplies the decoded time code information to the robot controller 56.

According to the present invention, the robot controller 56 via a suitable software control program, circuitry or via an external unit communicating with the robot controller 56, coordinates the positional coordinates of the robot control program with each frame of video signal as defined by the time code information received from the time code reader means 76. This may be implemented, by example only, by the robot controller 56 which divides each step or path of movement between two points into a number of increments, each at a time period corresponding to the time interval of each frame of video images or signals, i.e., every 1/30th or 1/24th second. The robot controller 56 learns and stores in memory the multi-axis positional coordinates of the robot arm at each 1/30th or 1/24th of a second. This links the multi-axis positional coordinates of the robot with the time code defining each frame of video signal.

After the robot controller 56 has completed the control program and moved the robot 10 or 60 through its predetermined path of movement, the synchronizing information synchronizing the time code with the positional coordinates of the robot corresponding to each frame of video signal may then be utilized to move the robot controller to any desired position in its predetermined path of movement during advance or rewind of the video tape on which the video signals have been recorded by the video tape recorder 72. As each frame of video signal on the video tape has a specific time code associated therewith, the robot controller 56 via the learned positional coordinates in memory can determine the multi-axis coordinates of the robot 10 or 60 corresponding to each time code of video information and thereby move the robot 10 or 60 to such coordinates as each frame of video information advances through the video tape recorder 72. The video tape recorder 72 may be stopped at any frame at which time the robot 10 or 60 will be precisely positioned in the same positional coordinates as it was when the video image recorded on the particular frame on the video tape was first taken. This simplifies editing since any portion of the video image on the video tape may be re-shot starting with the position of the robot at any position along its predetermined path of movement.

In summary, there has been disclosed a video time code synchronized robot control apparatus which coordinates time code information associated with each frame of a video image recorded on a video tape with the stored positional coordinates of a robot apparatus to enable the robot apparatus to be moved to a position corresponding to the position of its components when a particular frame of video image was first taken. Editing of the video tape as required to re-shoot a particular portion of an overall image sequence may easily be done on the same tape by moving the robot to any predetermined position along its path of movement corresponding to a particular frame of video image. The succeeding portion of the robot movement and/or the object being imaged may then be varied and new video images generated as the robot moves through its existing path of movement or a revised path of movement.

What is claimed is:

1. A video time code synchronized robot control apparatus comprising:

a robot including an arm movable through a path of movement;

a video camera, mounted on the arm of the robot, for generating video signals during operation of the video camera;

time code generator means for generating time code information;

video image storing means, responsive to the video signals from the video camera and the time code information from the time code generator means for storing a composite signal formed of the video signals and the time code information on a storage medium;

time code reader means, responsive to the composite video signal from the video image storing means, for decoding the time code information for each frame of the composite signal; and robot controller means for controlling the path of movement of the robot arm in accordance with a stored control program, the robot controller means being responsive to the time code information for storing the position coordinates of the robot arm along the path of movement for each distinct time code associated with the video signal on a video signal frame by frame basis and for synchronizing the movement of the robot arm along its predetermined path of movement with the time code information during the generation of video signals and time code information from the storage medium on a frame-by-frame basis.

2. The apparatus of claim 1 further comprising:
monitor means, connected to the video image storing means, for displaying video images from one of the video camera and the composite image recorded on the storage medium.

3. A video time code synchronized robot control apparatus comprising:
a robot including an arm movable through a path of movement;
a video camera, mounted on the arm of the robot, for generating video signals during movement of the video camera;
time code generator means for generating time code information;
the video signals from the video camera being output to the time code generator means;
video recorder means, responsive to the video signals from the video camera and the time code information from the time code generator means, for recording a composite signal formed of the video signals and the time code information on a recording medium;
the time code generator means outputting the video signals and the time code information to the video recorder means;
time code reader means, responsive to the composite video signal from the video recorder means, for decoding the time code information for each frame of the composite signal; and
robot controller means for controlling the path of movement of the robot arm in accordance with a stored control program, the robot controller means being responsive to the decoded time code information from the time code reader for synchronizing the movement of the robot arm along its predetermined path of movement with the time code information from the time code reader on a frame-by-frame basis.

4. The apparatus of claim 3 wherein the composite signal from the video tape recorder is input to the time code reader means.

5. A video time code synchronized robot control apparatus comprising:
a robot including an arm movable through a path of movement;
a video camera, mounted on the arm of the robot, for generating video signals during movement of the video camera;
time code generator means for generating time code information;
video recorder means, responsive to the video signals from the video camera and the time code information from the time code generator means, for recording a composite signal formed of the video signals and the time code information on a recording medium;
the video signals from the video camera being output to the video recorder means;
the time code information from the time code generator means being output to the video recorder means;
time code reader means, responsive to the composite video signal from the video recorder means, for decoding the time code information for each frame of the composite signal; and
robot controller means for controlling the path of movement of the robot arm in accordance with a stored control program, the robot controller means being responsive to the decoded time code information from the time code reader for synchronizing the movement of the robot arm along its predetermined path of movement with the time code information from the time code reader on a frame-by-frame basis.

6. The apparatus of claim 5 wherein:
the composite signal from the video tape recorder is input to the time code reader means.

7. A video time code synchronized robot control apparatus comprising:
a robot including an arm movable through a path of movement;
a video camera, mounted on the arm of the robot, for generating video signals during movement of the video camera;
combined video time code generator and reader means for separately generating time code information and for decoding time code information,
video recorder means, responsive to the video signals and the time code information from the combined time code generator and reader means, for recording a composite signal formed of the video signals and the time code information on a recording medium;
the time code information being output from the video recorder means to the reader portion of the combined time code generator and reader means; and
robot controller means for controlling the path of movement of the robot arm in accordance with a stored control program, the robot controller means being responsive to the decoded time code information from the combined time code generator and reader means for synchronizing the movement of the robot arm along its predetermined path of movement with the time code information from the combined time code generator and reader means on a frame-by-frame basis.

8. The apparatus of claim 7 wherein the composite signal from the video tape recorder is input to the combined time code generator and reader means for decoding the time code information and for outputting the decoded time code information to the robot controller.

9. A video time code synchronized robot control apparatus comprising:
a robot including an arm movable through a path of movement;
a video camera, mounted on the arm of the robot, for generating video signals during movement of the video camera;
time code generator means for generating time code information;
video recorder means, responsive to the video signals from the video camera and the time code information from the time code generator means, for recording a composite signal formed of the video signals and the time code information on a recording medium;
time code reader means, responsive to the composite video signal from the video recorder means, for decoding the time code information for each frame of the composite signal; and
robot controller means for controlling the path of movement of the robot arm in accordance with a stored control program, the robot controller means being responsive to the decoded time code information from the time code reader for synchronizing the movement of the robot arm along its predetermined path of movement with the time code information from the time code reader on a frame-by-frame basis the robot controller means including:

means for identifying the positional coordinate of the robot arm corresponding in time with each frame of video signals generated by the video camera; and the robot controller means further including means for moving the robot arm to the identified positional coordinates corresponding to any frame of video signals as the time code information identifying the any frame of video signals is input thereto from the time code reader means.

10. A method of generating video images comprising:

programming a robot to repeatedly move a video camera mounted on the end of a movable arm of the robot through a predetermined path of movement;

operating the video camera to generate video signals from the camera during movement of the arm of the robot along the predetermined path of movement;

generating video signal frame identification information in conjunction with the generation of video signals on a frame-by-frame basis of the generated video signals;

storing the position coordinates of the robot arm along the predetermined path of movement for each distinct one of the video signal frame identification information on a video signal frame-by-frame basis;

storing the video signals and the video signal frame identification information as a composite signal on a storage medium on a frame-by-frame basis; and synchronizing the movement of the robot arm along the predetermined path of movement with the video signal frame identification information during the generation of video signals from the storage medium such that the arm of the robot is position by the robot controller in the same position for each frame of video signal from the storage medium as when each frame of video signal was initially generated by the video camera.

11. The method of claim 10 wherein the step of generating video signal frame identification information comprises the step of:

generating time code information for each frame of video signal generated by the video camera.

12. A method of generating video images comprising:

programming a robot to repeatedly move an end of a movable arm of the robot through a predetermined path of movement;

operating a video camera to generate video signals of visual images along the predetermined path of movement from the camera during movement of the arm of the robot along the predetermined path of movement;

storing the position coordinates of the robot arm along the predetermined path of movement for each distinct frame of the video signal generated by the video camera on a video signal frame-by-frame basis;

storing the video signals on a storage medium on a video signal frame-by-frame basis; and synchronizing the movement of the robot arm along the predetermined path of movement with each frame of video signal during the generation of stored video signals from the storage medium such that the arm of the robot is positioned by the robot controller in the same position for each frame of video signal operated from the storage medium as when each frame of video signal was initially generated by the video camera.

13. The method of claim 12 wherein the step of storing the position coordinates of the robot arm further comprises the step of:

storing the position coordinates of the robot arm in a memory; and storing with each position coordinate a unique video signal frame identification data.

14. The method of claim 13 wherein the step of synchronizing further comprises the steps of:

generating video signals from the storage medium on a frame-by-frame basis;

generating the video frame identification data for each frame of video signal generated from the storage medium;

accessing the memory to identify the position coordinates of the robot arm associated with each generated video signal identification data; and moving the robot arm to the identified position coordinates on a video signal frame-by-frame basis as the video signals are generated from the storage medium.

* * * * *

REEXAMINATION CERTIFICATE (3403rd)

United States Patent [19]

Boyle

[11] B1 5,255,096

[45] Certificate Issued Dec. 23, 1997

[54] VIDEO TIME CODE SYNCHRONIZED ROBOT CONTROL APPARATUS

[76] Inventor: William M. Boyle, 2092 Saint Andrews, Rochester Hills, Mich. 48309

Reexamination Request:
No. 90/004,536, Feb. 3, 1997

Reexamination Certificate for:
Patent No.: 5,255,096
Issued: Oct. 19, 1993
Appl. No.: 866,446
Filed: Apr. 10, 1992

[51] Int. Cl.$^6$ .................................................. H04N 7/18
[52] U.S. Cl. .............................. 348/95; 348/119; 395/94; 386/65
[58] Field of Search .............. 348/95, 119; 386/65; 901/47; 395/80, 85, 86, 88, 94

[56] References Cited

U.S. PATENT DOCUMENTS

| | | | |
|---|---|---|---|
| 4,146,924 | 3/1979 | Birk et al. | 364/513 |
| 4,539,703 | 9/1985 | Clearman et al. | 382/28 |
| 4,689,683 | 8/1987 | Efron | 358/185 |
| 4,847,543 | 7/1989 | Fellinger | 318/628 |
| 4,942,538 | 7/1990 | Yuan et al. | 364/513 |

*Primary Examiner*—Victor R. Kostak

[57] ABSTRACT

The stored robot control program defining the path of movement of a robot arm carrying a video camera is synchronized to time code information recorded on a video tape. Video signals from the video camera are recorded on the video tape by a video tape recorder along with time code information from a time code generator. A time code reader decodes the time code information from the video tape or from the video tape recorder and supplies the decoded time code information to a robot controller. The time code information specifying the address of each frame of video signal is synchronized with the robot control program to enable the robot arm to be positioned in the same identical positional coordinates corresponding to the position of the robot arm when a particular frame of video signal was originally generated.

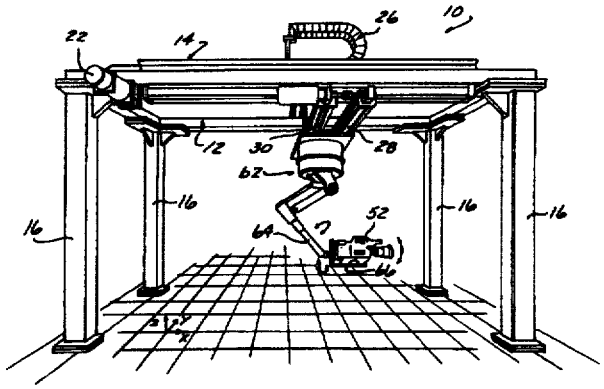

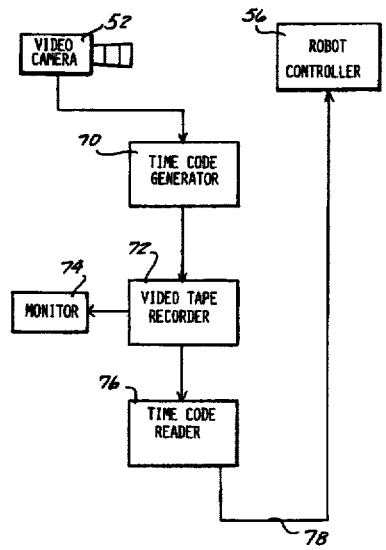

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *

EX PARTE REEXAMINATION CERTIFICATE (6082nd)

United States Patent
Boyle

(10) Number: US 5,255,096 C2
(45) Certificate Issued: Jan. 1, 2008

(54) VIDEO TIME CODE SYNCHRONIZED ROBOT CONTROL APPARATUS

(76) Inventor: William M. Boyle, 2092 Saint Andrews, Rochester Hills, MI (US) 48309

Reexamination Request:
No. 90/007,495, Apr. 4, 2005

Reexamination Certificate for:
Patent No.: 5,255,096
Issued: Oct. 19, 1993
Appl. No.: 07/866,446
Filed: Apr. 10, 1992

Reexamination Certificate B1 5,255,096 issued Dec. 23, 1997

(51) Int. Cl.
*G11B 27/024* (2006.01)
*G11B 27/32* (2006.01)
*G11B 27/22* (2006.01)
*G11B 27/29* (2006.01)
*G11B 27/10* (2006.01)
*H04N 7/18* (2006.01)

(52) U.S. Cl. ............... 348/96; 348/119; 348/E7.088; 386/117; 386/65; 700/259

(58) Field of Classification Search .............. 348/95, 348/119, E7.088; 386/117, 65; 700/259
See application file for complete search history.

(56) References Cited

U.S. PATENT DOCUMENTS

| 5,684,514 | A | 11/1997 | Branscomb |
| 5,977,992 | A | 11/1999 | Branscomb |

*Primary Examiner*—Charles R. Craver

(57) ABSTRACT

The stored robot control program defining the path of movement of a robot arm carrying a video camera is synchronized to time code information recorded on a video tape. Video signals from the video camera are recorded on the video tape by a video tape recorder along with time code information from a time code generator. A time code reader decodes the time code information from the video tape or from the video tape recorder and supplies the decoded time code information to a robot controller. The time code information specifying the address of each frame of video signal is synchronized with the robot control program to enable the robot arm to be positioned in the same identical positional coordinates corresponding to the position of the robot arm when a particular frame of video signal was originally generated.

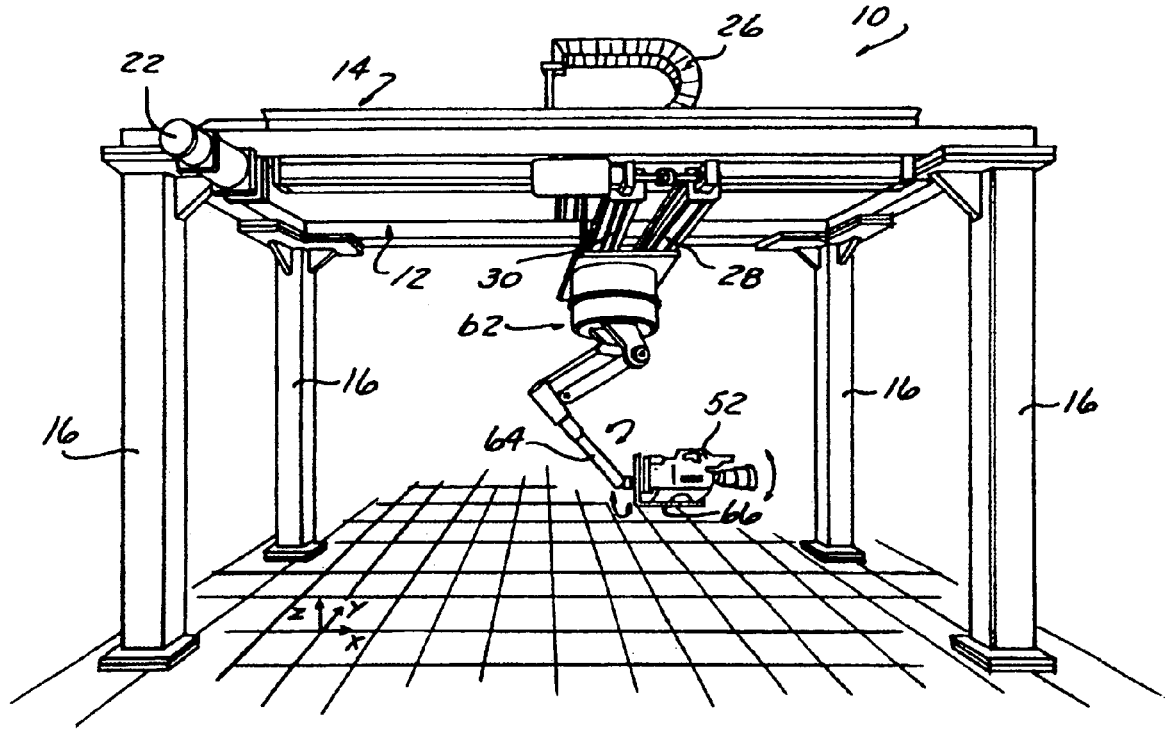

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *